(12) United States Patent
Yasuda et al.

(10) Patent No.: US 8,900,749 B2
(45) Date of Patent: Dec. 2, 2014

(54) NEGATIVE ELECTRODE MATERIAL POWDER FOR LITHIUM ION SECONDARY BATTERY, NEGATIVE ELECTRODE FOR LITHIUM ION SECONDARY BATTERY, NEGATIVE ELECTRODE FOR CAPACITOR, LITHIUM ION SECONDARY BATTERY, AND CAPACITOR

(75) Inventors: Kouji Yasuda, Amagasaki (JP); Shingo Kizaki, Amagasaki (JP); Shinji Shimosaki, Amagasaki (JP)

(73) Assignee: OSAKA Titanium technologies Co., Ltd., Hyogo (JP)

( * ) Notice: Subject to any disclaimer, the term of this patent is extended or adjusted under 35 U.S.C. 154(b) by 18 days.

(21) Appl. No.: 13/810,554

(22) PCT Filed: Jul. 8, 2011

(86) PCT No.: PCT/JP2011/003938
§ 371 (c)(1),
(2), (4) Date: Jan. 16, 2013

(87) PCT Pub. No.: WO2012/011247
PCT Pub. Date: Jan. 26, 2012

(65) Prior Publication Data
US 2013/0164621 A1 Jun. 27, 2013

(30) Foreign Application Priority Data
Jul. 20, 2010 (JP) .................................. 2010-162721

(51) Int. Cl.
*H01M 4/13* (2010.01)
*H01G 11/30* (2013.01)
(Continued)

(52) U.S. Cl.
CPC ............... *H01M 4/134* (2013.01); *H01G 11/30* (2013.01); *H01G 9/0425* (2013.01); *H01M 4/485* (2013.01); *H01M 4/366* (2013.01); *H01G 11/06* (2013.01); *Y02E 60/13* (2013.01); *Y02E 60/122* (2013.01); *H01M 4/625* (2013.01); *H01M 4/131* (2013.01)
USPC ....................................................... 429/218.1

(58) Field of Classification Search
None
See application file for complete search history.

(56) References Cited

U.S. PATENT DOCUMENTS

2003/0215711 A1   11/2003   Aramata et al.
2004/0033419 A1*  2/2004   Funabiki ................... 429/218.1
(Continued)

FOREIGN PATENT DOCUMENTS

CN   1513922      7/2004
CN   102947999    2/2013
(Continued)

*Primary Examiner* — Patrick Ryan
*Assistant Examiner* — Jose Colucci Rios
(74) *Attorney, Agent, or Firm* — Clark & Brody

(57) ABSTRACT

A negative electrode material powder for a lithium ion secondary battery having a conductive carbon film on the surface of a lower-silicon-oxide powder; wherein a specific surface area in BET measurement ranges from more than 0.3 $m^2/g$ to 40 $m^2/g$, and no SiC peak appears at $2\theta=35.6°\pm0.01°$ or the half-value width of the appeared peak is 2° or more in XRD measurement using $CuK_\alpha$ rays. The proportion of said carbon film preferably ranges from 0.2% to 2.5% by mass. Said powder preferably has 100000 Ωcm or less of specific resistance. In XRD, P2/P1<0.01 is preferably satisfied between the highest value P1 of halo of $SiO_x$ and a value P2 of the strongest linear peak of Si (111) above the halo.
Accordingly, said powder can be used in the secondary battery with a large discharge capacity and a preferable cycle characteristics for practical use.

12 Claims, 1 Drawing Sheet

(51) Int. Cl.
*H01G 9/042* (2006.01)
*H01M 4/485* (2010.01)
*H01M 4/36* (2006.01)
*H01G 11/06* (2013.01)
*H01M 4/134* (2010.01)
*H01M 4/62* (2006.01)
*H01M 4/131* (2010.01)

(56) References Cited

U.S. PATENT DOCUMENTS

| | | | |
|---|---|---|---|
| 2006/0068287 A1* | 3/2006 | Morita et al. | 429/223 |
| 2007/0099436 A1* | 5/2007 | Kogetsu et al. | 438/770 |
| 2009/0181304 A1* | 7/2009 | Miyamoto et al. | 429/218.1 |
| 2011/0111303 A1* | 5/2011 | Kung et al. | 429/231.8 |
| 2012/0009473 A1* | 1/2012 | Ishida et al. | 429/218.2 |
| 2013/0224600 A1 | 8/2013 | Yasuda et al. | |

FOREIGN PATENT DOCUMENTS

| | | |
|---|---|---|
| JP | 2004-063433 | 2/2004 |
| JP | 2004-335195 | 11/2004 |
| JP | 2005-085717 | 3/2005 |
| JP | 2007-165108 | 6/2007 |
| JP | 3952180 | 8/2007 |
| WO | 03/096449 | 11/2003 |

* cited by examiner

NEGATIVE ELECTRODE MATERIAL POWDER FOR LITHIUM ION SECONDARY BATTERY, NEGATIVE ELECTRODE FOR LITHIUM ION SECONDARY BATTERY, NEGATIVE ELECTRODE FOR CAPACITOR, LITHIUM ION SECONDARY BATTERY, AND CAPACITOR

TECHNICAL FIELD

The present invention relates to a negative electrode material powder for lithium ion secondary batteries, which can be used to obtain a lithium ion secondary battery that is durable at practical level with large discharge capacity and good cycle characteristics, a negative electrode for a lithium ion secondary battery and a negative electrode for a capacitor, each using the negative electrode material powder, and a lithium ion secondary battery and a capacitor using the negative electrode for the lithium ion secondary battery and the negative electrode for the capacitor, respectively.

BACKGROUND ART

In association with a recent noticeable development in a portable electronic equipment, communication equipment and the like, development of secondary batteries with high energy density is strongly requested from the viewpoint of the economic efficiency and reduction in size and weight of the equipment. Currently available secondary batteries with high energy density include a nickel-cadmium battery, a nickel hydrogen-battery, a lithium ion secondary battery, a polymer battery and the like. Among these batteries, demand for the lithium ion secondary battery is strongly growing in the power source market due to its dramatically enhanced life and capacity, compared with the nickel cadmium battery or nickel-hydrogen battery.

FIG. 1 is a view showing a configuration example of a coin-shaped lithium ion secondary battery. The lithium ion secondary battery includes, as shown in FIG. 1, a positive electrode 1, a negative electrode 2, a separator 3 impregnated with electrolyte, and a gasket 4 which seals what is contained in the battery while maintaining the electric insulation between the positive electrode 1 and the negative electrode 2. When charging and discharging are performed, lithium ions reciprocate between the positive electrode 1 and the negative electrode 2 through the electrolyte of the separator 3.

The positive electrode 1 includes a counter electrode case 1a, a counter electrode current collector 1b and a counter electrode 1c, and lithium cobaltate ($LiCoO_2$) or manganese spinel ($LiMn_2O_4$) is mainly used for the counter electrode 1c. The negative electrode 2 includes a working electrode case 2a, a working electrode current collector 2b and a working electrode 2c, and a negative electrode material used for the working electrode 2c generally includes an active material capable of occluding and releasing lithium ions (negative electrode active material), a conductive auxiliary agent, and a binder.

As the negative electrode active material for lithium ion secondary batteries, conventionally, a composite oxide of lithium and boron, a composite oxide of lithium and transition metal (V, Fe, Cr, Mo, Ni, etc.), a compound including N and O as well as Si, Ge or Sn, Si particle the surface of which is coated with a carbon layer by chemical vapor deposition, and the like are proposed.

However, each of these negative electrode active materials makes deterioration of an electrode significant since dendrite or a passivated compound is generated on the electrode according to repeated charging and discharging, or enhances the expansion or contraction thereof during occlusion and release of lithium ions, although it can improve the charging and discharging capacities to enhance the energy density. Therefore, lithium ion secondary batteries using these negative electrode active materials are insufficient in the maintainability of discharge capacity by repeated charging and discharging (hereinafter referred to as "cycle characteristics").

Meanwhile, it is conventionally attempted to use powders of generic silicon oxide represented by $SiO_x$ ($0<x\leq2$), such as SiO, as the negative electrode active material. The silicon oxide can be a negative electrode active material with a larger effective charging and discharging capacity, since it is lower (less noble) in electrode potential than lithium and can reversibly occlude and release lithium ions without deterioration during charging and discharging such as collapse of a crystal structure by the occlusion and release of lithium ions or generation of an irreversible substance. Therefore, the silicon oxide can be used as the negative electrode active material to obtain a lithium ion secondary battery which is higher in capacity than in a case using carbon and is much better in cycle characteristics than in a case using a high-capacity negative electrode material such as Si or Sn alloy.

When the silicon oxide powder is used as the negative electrode active material, in general, carbon powder or the like is mixed thereto as a conductive auxiliary agent for compensating the low electric conductance of the silicon oxide. This allows the electric conductivity to be secured around a contact portion between the silicon oxide powder and the conductive auxiliary agent. However, at locations far away from the contact portion, the silicon oxide powder is less likely to function as the negative electrode active material since the electric conductivity cannot be secured.

In order to solve this problem, proposed in Patent Literature 1 is a conductive silicon composite for a negative electrode material for use in a non-aqueous electrolyte secondary battery which contains a film of carbon formed on the surface of a particle having a structure in which microcrystals of silicon are dispersed in silicon dioxide (conductive silicon composite), and a method for producing the same.

CITATION LIST

Patent Literature

PATENT LITERATURE 1: Japanese Patent No. 3952180

SUMMARY OF INVENTION

Technical Problem

According to the method proposed in Patent Literature 1, the formation of a uniform carbon film on the conductive silicon composite allows a sufficient electric conductivity to be secured. However, according to the present inventors' examinations, a lithium ion secondary battery using the conductive silicon composite of Patent Literature 1 had a problem such that since the silicon dioxide with microcrystals of silicon dispersed therein is used as the negative electrode material, the level of expansion and contraction become significantly large in the absorption and desorption of lithium ions during charging and discharging, causing a sudden drop of capacity at a certain point of time when the charging and discharging are repeated. Further, the lithium ion secondary battery was not sufficient in discharge capacity and cycle characteristics.

In view of this problem, the present invention has an object to provide a negative electrode material powder for a lithium ion secondary battery which is durable at practical level with large discharge capacity and good cycle characteristics, a negative electrode for a lithium ion secondary battery and a negative electrode for a capacitor, each using the negative electrode material powder, and a lithium ion secondary battery and a capacitor using the negative electrode for the lithium ion secondary battery and the negative electrode for the capacitor, respectively.

Solution to Problem

In order to solve the above problem, the present inventors have extensively investigated silicon oxide, which is considered to serve as a negative electrode material powder (negative electrode active material) that facilitates the capacity of a lithium ion secondary battery to be increased. As a result, the present inventors have reached a conclusion that deterioration of the first cycle efficiency (a ratio of the charge capacity and the discharge capacity in the first charge/discharge cycle (first charging and discharging of the battery) after the lithium ion secondary battery is manufactured) is due to the formation of $Li_4SiO_4$ through lithium ion desorption in the negative electrode material as illustrated in the following formula (1). $Li_{22}Si_5$ of the first term on the right hand side of the formula (1) is a component to deliver the reversible capacity and $Li_4SiO_4$ of the second term is a component to deliver the irreversible capacity. $Li_4SiO_4$ cannot release lithium ions.

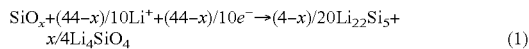

$$SiO_x + (44-x)/10 Li^+ + (44-x)/10 e^- \rightarrow (4-x)/20 Li_{22}Si_5 + x/4 Li_4SiO_4 \qquad (1)$$

The investigation by the present inventors has revealed that theoretical characteristics of the lithium ion secondary battery when a silicon oxide ($SiO_x$) powder is used as a negative electrode material powder and x=1 has 2007 mAh/g of reversible capacity and 76% of the first cycle efficiency. Since the reversible capacity of a conventional lithium ion secondary battery using silicon oxide as a negative electrode material powder has hitherto been in a range of 1500 mAh/g or less at best, the present inventors have found that there is still a room for the improvement of the reversible capacity of the lithium ion secondary battery using silicon oxide as a negative electrode material powder.

The present inventors have therefore investigated how to suppress the formation of the component responsible for the irreversible capacity. It is considered that the smaller the specific surface area (surface area per unit mass) of silicon oxide powder, the more the formation of the component responsible for the irreversible capacity in the first charge/discharge cycle is suppressed. Further investigation based on this point of view has revealed that an excellent first cycle efficiency can be obtained when the specific surface area of silicon oxide powder measured through the BET method is 40 m²/g or less, and a much more excellent first cycle efficiency can be obtained when the specific surface area is 5.0 m²/g or less. However, the specific surface area thereof is preferably 0.3 m²/g or more, since the particle size has to be increased in order to reduce the specific surface area and particles with an excessive large specific surface area results in a reduced yield in manufacture of the silicon oxide powder, which makes its economical production difficult.

In order to identify a cause of the capacity reduction of lithium ion secondary battery, the present inventors have further investigated, among silicon oxide-based materials used as negative electrode material powders, in particular, the silicon oxide with a carbon film being formed thereon as enabling the capacity of lithium ion secondary battery to be increased and enabling the first cycle efficiency and cycle characteristics to be relatively improved.

In this investigation, the change of the capacity of the lithium ion secondary battery under repetitive charge/discharge cycles has been investigated, using various types of silicon oxides having the same composition and the same average particle size under the same condition as negative electrode material powders, which were prepared by carbon film-forming treatment followed by heat treatment under various conditions to graphitize the carbon component. The negative electrode material powder was analyzed using an X-ray diffractometer (XRD).

As a result, it was found that the lithium ion secondary battery using the negative electrode material powder with a SiC peak appeared in an XRD chart exhibits significant capacity deterioration. A further investigation confirmed that there is a correlation between the presence/absence of the SiC peak (to appear at 2θ=35.6°±0.1° in measurement using CuKα rays radiation) and the half-value width thereof in the XRD chart, and the first cycle capacity of the lithium ion secondary battery.

Specifically, when the SiC peak appeared in the XRD chart and the half-value width thereof was less than 2°, the first cycle capacity of the lithium ion secondary battery was the lowest among others. Appearance of the SiC peak means that SiC was formed in the vicinity of an interface between silicon oxide and the carbon film, and less than 2° of the half-value width of the peak means an excessive formation of crystalline SiC. From these facts, it seems that one reason for the low first cycle capacity is Si converted into SiC, which hardly contributes to the battery capacity. Further, it seems that another reason for the low first cycle capacity is the formation of a SiC layer, which blocks migration of lithium ions into silicon oxide. Formation of SiC was facilitated in high temperature treatment in which reaction of silicon oxide with the carbon film is facilitated, and for example, when heat treatment temperature was as high as 1100° C., the SiC peak with less than 2° of the half-value width appeared in the XRD chart.

The present invention has been devised in view of the above findings and summaries thereof reside in a negative electrode material powder for a lithium ion secondary battery described in the following descriptions (1) to (4), a negative electrode of the lithium ion secondary battery and a negative electrode for a capacitor in the following description (5), and a lithium ion secondary battery and a capacitor in the following description (6).

(1) A negative electrode material powder for a lithium ion secondary battery having a conductive carbon film on the surface of a lower-silicon-oxide powder; in which a specific surface area determined by the BET method ranges from more than 0.3 m²/g to 40 m²/g, and a SiC peak is immune from appearing at 2θ=35.6°±0.1° or the half-value width of the appeared peak is 2° or more, in measurement with an X-ray diffractometer using CuKα rays radiation.

(2) The negative electrode material powder for a lithium ion secondary battery as in the above description (1), in which the ratio occupied by the conductive carbon film ranges from 0.2% or more by mass to 2.5% or less by mass.

(3) The negative electrode material powder for the lithium ion secondary battery as in the above descriptions (1) or (2), in which the specific resistance is 100000 Ωcm or less.

(4) The negative electrode material powder for the lithium ion secondary battery as in any one of the above descriptions (1) to (3); in which in measurement with an XRD using CuKα rays radiation, P2/P1<0.01 is satisfied, given that the highest value of halo due to $SiO_x$ that appears at 2θ=10° to 30° is P1 and a value of the strongest linear peak of Si (111) that appears at 2θ=28.4±0.3° above said halo is P2.

(5) A negative electrode for a lithium ion secondary battery or a negative electrode for a capacitor using the negative electrode material powder for the lithium ion secondary battery as in any one of the above descriptions (1) to (4).

(6) A lithium ion secondary battery or a capacitor using the negative electrode for the lithium ion secondary battery or the negative electrode for the capacitor as in the above description (5).

According to the present invention, the expression "lower-silicon-oxide powder" means $SiO_x$ powder where a subscript x satisfies the condition 0.4≤x≤1.2. A method of measuring x and the specific surface area through the BET method will be described below.

The expression "having a conductive carbon film on the surface" with regard to the lower-silicon-oxide powder means that, as described below, the result of surface analysis using an X-ray photoelectron spectroscopy device indicates that the molar ratio (Si/C) of Si to C is 0.02 or less, that is, the surface of the lower-silicon-oxide powder is almost completely covered with C and almost no Si is exposed.

Advantageous Effects of Invention

The negative electrode material powder for a lithium ion secondary battery and the negative electrode for the lithium ion secondary battery or the negative electrode for a capacitor according to the present invention can be used to obtain a lithium ion secondary battery and a capacitor which are durable at practical level with large discharge capacity and good cycle characteristics. The lithium ion secondary battery and capacitor of the present invention are large in discharge capacity and good in cycle characteristics.

DESCRIPTION OF EMBODIMENTS

Figure 1:
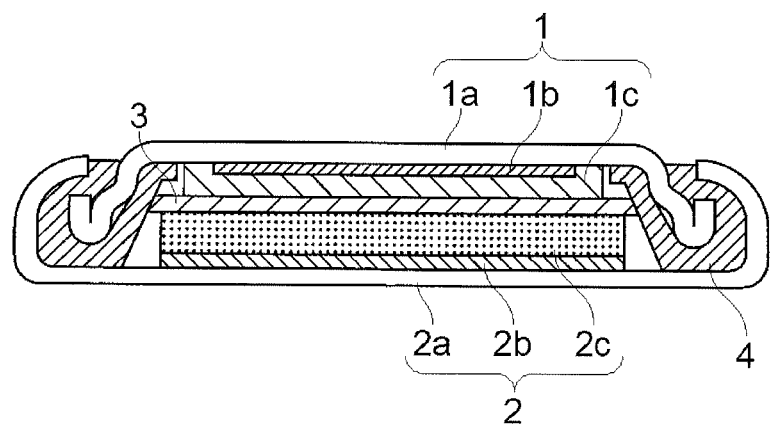
FIG. 1 is a view showing a configuration example of a coin-shaped lithium ion secondary battery.

1. Negative Electrode Material Powder for Lithium Ion Secondary Battery According to the Present Invention A negative electrode material powder for a lithium ion secondary battery according to the present invention has a conductive carbon film on the surface of a lower-silicon-oxide powder; in which the specific surface area in measurement through the BET method ranges from more than 0.3 m²/g to 40 m²/g or less, and no SiC peak appears at 2θ=35.6°±0.1° or the half-value width of the peak thereof is 2° or more in measurement through the XRD method using $CuK_\alpha$ rays radiation. The specific surface area measured through the BET method preferably ranges from 0.3 m²/g to 5.0 m²/g.

The lower-silicon-oxide powder means the $SiO_x$ powder where a subscript x satisfies the condition of 0.4≤x≤1.2 as described above. The reason why x is defined in said range is that, when the subscript x is smaller than 0.4, the lithium ion secondary battery and capacitor using the negative electrode material powder according to the present invention exhibit a significant deterioration through charge/discharge cycles, while when the x is larger than 1.2, the battery capacity becomes small. The range of x preferably satisfies the condition of 0.8≤x≤1.05.

The negative electrode material powder for the lithium ion secondary battery according to the present invention preferably has the proportion of the conductive carbon film (hereinafter, referred to as the "coverage rate of carbon film") in the range of 0.2% by mass to 2.5% by mass.

Similarly to the lower-silicon-oxide, the carbon film contributes to the charge/discharge capacity of the lithium ion secondary battery, but the charge/discharge capacity per unit mass thereof is smaller as compared to the lower-silicon-oxide. Therefore, in order to ensure a preferable charge/discharge capacity of the lithium ion secondary battery, it is preferable for the coverage rate of carbon film in the negative electrode material powder thereof to be as low as possible. Meanwhile, when the coverage rate of carbon film is too small, the conductivity attributable to the conductive carbon film cannot be obtained. From these findings the coverage rate of carbon film is preferably in the range of 0.2% by mass to 2.5% by mass.

It is preferable that in measurement with an XRD using $CuK_\alpha$ rays radiation, the negative electrode material powder for the lithium ion secondary battery satisfies the condition of P2/P1<0.01, that is, an amorphous state, given the highest halo value P1 due to $SiO_x$ that appears at 10°≤2θ≤30° and the strongest linear peak value P2 of Si (111) that appears at 2θ=28.4±0.3° above said halo. This is because in the lithium ion secondary battery, the lower-silicon-oxide powder in the negative electrode material powder is preferably amorphous.

An average particle size of the negative electrode material powder for the lithium ion secondary battery is preferably in the range of 1 μm to 15 μm, more preferably in the range of 3 μm to 12 μm. When the average particle size is too small, a homogenous slurry cannot be obtained in preparation of electrodes, and thus powders are apt to be detached from a current collector. Meanwhile, too large average particle size makes it difficult to prepare an electrode film constituting the working electrode 2c illustrated in FIG. 1, and powders are apt to be detached from the current collector. The average particle size corresponds to a weighted average value $D_{50}$ (the particle size or median diameter corresponding to 50% of cumulative weight percentage to total weight) in particle size distribution measured through the laser diffraction method.

The specific resistance of the negative electrode material powder for the lithium ion secondary battery is preferably 100000 Ωcm or less. This is because its function as the electrode active material for the lithium ion secondary battery is apt to deteriorate when the specific resistivity is more than 100000 Ωcm. Since the smaller the specific resistance, the better electrical conductivity is obtained, it is not necessary to set the minimum specific resistance of the electrode active material for the lithium ion secondary battery in a preferable condition.

3. Analysis Method 3-1 Evaluation Method of the Formation State of the Conductive Carbon Film In the negative electrode material powder for the lithium ion secondary battery according to the present invention, the expression "having the conductive carbon film on the surface of the lower-silicon-oxide powder" means that the molar ratio (Si/C) of Si to C is 0.2 or less, when the surface of the lower-silicon-oxide powder subjected to the carbon film-forming treatment is analyzed with an X-ray photoelectron spectroscopy (XPS) device using AlKα rays radiation (1486.6 eV). Conditions for the XPS measurement are given in Table 1. The expression "the value of Si/C is 0.02 or less" means the surface of lower-silicon-oxide powder is almost completely covered with C and almost no Si is exposed.

TABLE 1

| Device | Quantera SXM (made by PHI) |
| --- | --- |
| Excitation X-rays | Al Kα rays (1486.6 eV) |
| Escape angle of photoelectron | 45° |
| Correction of binding energy | C1s main peak is set as 284.6 eV |
| Electron orbital | C1s, Si2p |

3-2 Measurement Method of the Specific Surface Area of Lower-Silicon-Oxide Powder The specific surface area of lower-silicon-oxide powder can be measured whether a conductive carbon film is formed or not, using the BET method below. A sample of 0.5 g was placed in a glass cell, and dried under a reduced pressure at 200° C. for approximately 5 hours. A nitrogen gas adsorption isotherm of the sample was measured at the temperature of liquid nitrogen (−196° C.) to evaluate the specific surface area. The measurement conditions are given in Table 2.

TABLE 2

| Device | BELSORP-18PLUS-HT (made by BEL JAPAN, INC.) |
| --- | --- |
| Measurement mode | A multipoint method was used to measure isothermal adsorption processes. Linear regression at relative pressure of 0.1 to 0.3. |
| Saturation vapor pressure | 101.3 kPa |
| Relative pressure for measurement | 0 to 0.4 |
| Time for equilibrium | 180 seconds after the equilibrium pressure is obtained |

3-3. Measurement Method of the Carbon Film Coverage Rate

The carbon film coverage rate was evaluated using a mass of the negative electrode material powder for the lithium ion secondary battery and the carbon content quantified by analysis of $CO_2$ gas through the oxygen stream combustion-infrared ray absorption method using a carbon concentration analyzer (CS400 made by Leco). A ceramic crucible was used and copper was used as a combustion accelerator. The analysis time period was 40 seconds.

3-4. Measurement Method of O (Oxygen) Content

The O content in the negative electrode material powder for the lithium ion secondary battery was evaluated by quantifying the O content in a sample of 10 mg with an oxygen concentration analyzer (TC436 made by Leco) through the inert gas fusion and infrared ray absorption method.

3-5. Measurement Method of Si Content

The Si content in the negative electrode material powder for the lithium ion secondary battery was evaluated by quantifying Si content in a sample after nitric acid and hydrofluoric acid were added to the sample to be dissolved, and the obtained solution was analyzed with an ICP optical emission spectrometer (made by Shimadzu Corporation). In this method, Si, SiO, and $SiO_2$ were dissolved to detect Si as a constituent of these.

3-6. Calculation Method of the Subscript x in $SiO_x$

The value x in $SiO_x$, which is the molar ratio (O/Si) of the O content to the Si content in the negative electrode material powder for the lithium ion secondary battery, was evaluated using the O content and the Si content measured through the measurement method described above.

3-7. Measurement of Specific Resistance

The specific resistance ρ (Ωcm) of the negative electrode material powder for the lithium ion secondary battery is calculated using the following equation (2).

$$\rho = R \times A / L \quad (2)$$

given R: electric resistance of sample (Ω), A: bottom area of sample ($cm^2$), and L: thickness of sample (cm).

The electric resistance of a sample is measured by a two-terminal method using a digital multimeter (made by IWATSU TEST INSTRUMENTS CORP., VOAC 7513) after filling the sample of 0.20 g to a powder resistance measuring tool (tool: made of stainless steel with an inside diameter 20 mm, frame: made of polytetrafluoroethylene) followed by pressurization at 20 kgf/$cm^2$ for 60 seconds. The thickness of the sample is measured using a micrometer.

4. Production of Lower-Silicon-Oxide Powder

Figure 2:
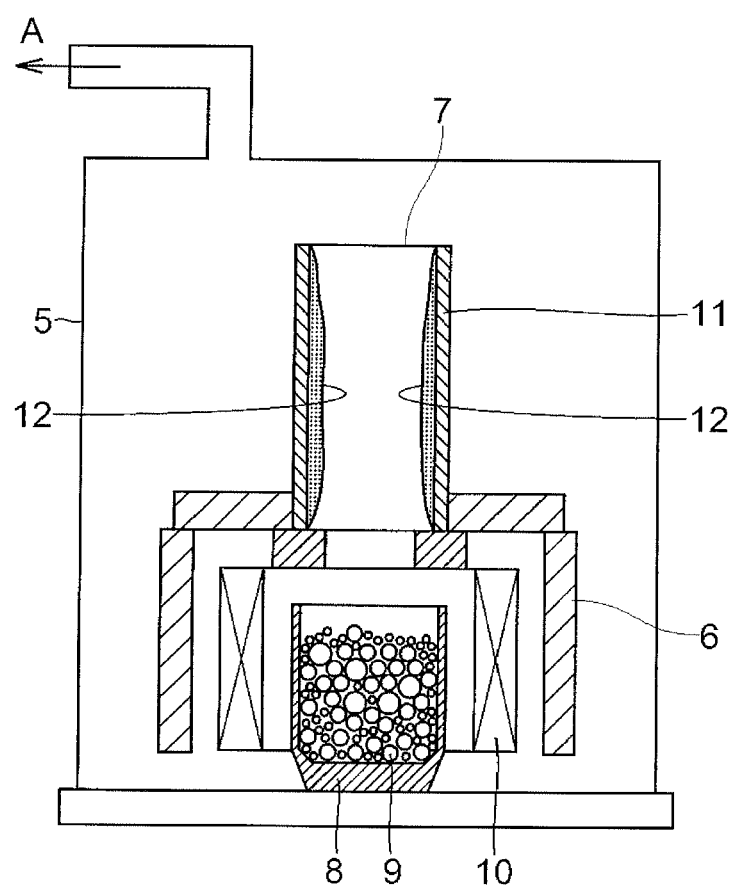
FIG. 2 is a view showing a configuration example of a production equipment for a silicon oxide.

FIG. 2 is a view showing a configuration example of a production apparatus for a silicon oxide. This apparatus includes a vacuum chamber 5, a raw material chamber 6 disposed inside the vacuum chamber 5, and a precipitation chamber 7 disposed above the raw material chamber 6.

The raw material chamber 6 comprises a cylindrical body, wherein a cylindrical raw material container 8 is disposed at the central portion of the body and a heating source 10 is disposed to surround the raw material container 8. As the heating source 10, for example, an electric heater can be used.

The precipitation chamber 7 comprises a cylindrical body disposed so that its axis is coincident to that of the raw material container 8. The inner periphery of the precipitation chamber 7 is provided with a precipitation substrate 11 made of stainless steel to deposit gaseous silicon oxide generated by sublimation in the raw material chamber 6 thereon.

A vacuum device (not shown) for discharging the atmospheric gas is connected to the vacuum chamber 5 housing the raw material chamber 6 and the precipitation chamber 7 to discharge the gas in the direction of arrow A.

When a lower-silicon-oxide is produced using the production apparatus shown in FIG. 2, a mixed granulated raw material 9 obtained by blending a silicon powder with a silicon dioxide powder in a predetermined proportion as a raw material, followed by mixing, granulating and drying, is used. This mixed granulated raw material 9 is filled in the raw material container 8, and heated by the heating source 10 in an inert gas atmosphere or in vacuum to generate (sublimate) gaseous SiO. The gaseous SiO generated by sublimation ascends from the raw material chamber 6 into the precipitation chamber 7, in which it is deposited on the peripheral precipitation substrate 11 and precipitated as a lower-silicon-oxide 12. Thereafter, the precipitated lower-silicon-oxide 12 is taken off from the precipitation substrate 11, and pulverized by use of a ball mill or the like, whereby a lower-silicon-oxide powder is obtained.

5. Method of Forming Conductive Carbon Film

CVD and the like are used to form a conductive carbon film on the surface of the lower-silicon-oxide powder. Specifically, a rotary kiln is used as the device and a mixed gas of a hydrocarbon gas or gas containing an organic substance and an inert gas is used.

A conductive carbon film-forming treatment temperature is in the range of 600° C. to 900° C. The treatment period ranges from 20 minutes to 120 minutes and was selected depending on the thickness of the conductive carbon film formed. The treatment time period is adjusted so that SiC is not formed in the vicinity of an interface between the surface of lower-silicon-oxide powder and the conductive carbon film. Formation of the conductive carbon film on the lower-silicon-oxide powder, which is an insulator, can improve the discharge capacity of the lithium ion secondary battery using the lower-silicon-oxide powder as the negative electrode material powder.

6. Heat Treatment Method of Lower-Silicon-Oxide Powder on which Conductive Carbon Film is Formed The lower-silicon-oxide powder on which the conductive carbon film is formed is heat-treated in an inert gas atmosphere for 2 hours or less at a temperature in the range of 800° C. to 900° C. This treatment graphitizes the carbon component in the conductive carbon film and improves the electrical conductivity. Within the above heat treatment temperature, formation of SiC in the vicinity of an interface between the silicon oxide and the carbon film can be suppressed.

7. Configuration of Lithium Ion Secondary Battery

A configuration example of a coin-shaped lithium ion secondary battery using the negative electrode material powder for the lithium ion secondary battery and a negative electrode for the lithium ion secondary battery of the present invention will be described with reference to FIG. 1. The basic configuration of the lithium ion secondary battery shown in the same drawing is as described above.

The negative electrode material used for the working electrode 2c constituting the negative electrode 2 or the negative electrode for the lithium ion secondary battery of the present invention is produced by using the negative electrode material powder for the lithium ion secondary battery of the present invention. Concretely, it can include the negative electrode material powder for the lithium ion secondary battery of the present invention that is an active material, other active materials, a conductive auxiliary agent and a binder. Among the constituent materials in the negative electrode material, the proportion of the negative electrode material powder for the lithium ion secondary battery of the present invention to the total of the constituent materials except the binder is set to 20% or more by mass. The active materials other than the negative electrode material powder for the lithium ion secondary battery of the present invention do not necessarily have to be added. As the conductive auxiliary agent, for example, acetylene black or carbon black can be used, and as the binder, for example, polyacrylic acid (PAA) or polyvinylidene fluoride can be used.

The lithium ion secondary battery of the present invention is durable at practical level with large discharge capacity and good cycle characteristics, since the above-mentioned negative electrode material powder for the lithium ion secondary battery and the negative electrode for the lithium ion secondary battery of the present invention are used.

The negative electrode material powder of the present invention and the negative electrode using the same can be applied also to a capacitor.

EXAMPLES

In order to confirm the effects of the present invention, the following tests were performed using a lithium ion secondary battery and results thereof were evaluated.

1. Test Condition

1-1. Configuration of the Lithium Ion Secondary Battery

The configuration of the lithium ion secondary battery has a coin shape illustrated in FIG. 1.

First the negative electrode 2 will be described. A silicon powder and a silicon dioxide powder in a predetermined ratio were blended, mixed, granulated, and dried to form a mixed granulated material as a raw material, to precipitate a lower-silicon-oxide on a precipitation substrate using the device illustrated in FIG. 2. The precipitated lower-silicon-oxide was pulverized for 24 hours into powders with an average particle size ($D_{50}$) of 5.1 μm using an alumina ball mill machine. The lower-silicon-oxide ($SiO_x$) powder obtained has the specific surface area of 3 m$^2$/g measured through the BET method, and the value of P2/P1 was 0.009 (P2/P1=0.009) measured through the above XRD method, and the subscript value x was one (1) (x=1).

A conductive carbon film was formed on the lower-silicon-oxide powder using a rotary kiln as the device and a mixed gas of $C_3H_8$ and Ar. The coverage rate of carbon film was 2.4% by mass.

Further, the lower-silicon-oxide powder, on which a conductive carbon film was formed, was heat-treated to yield the negative electrode material powder for the lithium ion secondary battery. The conditions for heat treatment (temperature and time) are shown in Table 3.

[Table 3]

TABLE 3

| Test No. | Test sample | Heat treatment temperature (° C.) | Heat treatment time (minutes) | Half-value width of SiC in XRD peak (°) | Specific resistance (Ωcm) | First discharge capacity (mAh/g) |
|---|---|---|---|---|---|---|
| 1 | Inventive Example | 850 | 120 | No peak | 14 | 1,821 |
| 2 | Inventive Example | 900 | 120 | 3.1 | 12 | 1,796 |
| 3 | Comparative Example | 900 | 240 | 1.6 | 12 | 1,498 |
| 4 | Comparative Example | 1,000 | 120 | 1.7 | 8 | 1,415 |
| 5 | Comparative Example | 1,100 | 60 | 1.8 | 10 | 1,433 |
| 6 | Comparative Example | 1,200 | 60 | 0.7 | 8 | 1,085 |

Test Nos. 1 and 2 are Inventive Examples, in which XRD analysis of the negative electrode material powder for the lithium ion secondary battery showed no SiC peak or the half-value width of 2° or larger, and Test Nos. 3 to 6 are Comparative Examples, in which the half-value width of the SiC peak is less than 2°.

To a mixture of 65% by mass of such negative electrode material powder for the lithium ion secondary batteries, 10% by mass of acetylene black, and 25% by mass of PAA, n-methylpyrolidone were added to form slurry. The slurry was coated on a copper foil with the thickness of 20 μm and dried under an atmosphere at 120° C. for 30 minutes, followed by punching out into the negative electrode 2 with a surface area of 1 cm$^2$ per unit surface.

A lithium foil was used for the counter electrode 1c. $LiPF_6$ (lithium hexafluorophosphate) was dissolved in a mixed solution of ethylene carbonate (EC) and diethyl carbonate (DEC) in the proportion of 1:1 by volume, so as to adjust the concentration thereof to 1 mol/L to yield the electrolyte. A porous polyethylene film with the thickness of 30 μm was used as the separator.

1-2. Condition for Charging/Discharging Testing

A secondary battery charging/discharging test instrument (made by NAGANO Co., Ltd.) was used for the charging/discharging test. A lithium ion secondary battery was charged with a constant current of 1 mA until the voltage between both electrodes thereof reached 0 V and after reaching the voltage at 0 V, they were charged while the voltage is kept at 0V. Thereafter, the charging was terminated when the current value fell below 20 μA. The discharging was performed with a constant current of 1 mA until the voltage between both electrodes of the lithium ion secondary battery reached 1.5 V.

2. Test Results

A charging/discharging test was performed on the lithium ion secondary battery prepared under the above conditions using the initial discharge capacity as a performance index. The specific resistance of the lithium ion secondary batteries was also measured. The results together with the test conditions are shown in Table 3.

In Test No. 1, which is Inventive Example, SiC was not formed in the vicinity of an interface between the silicon oxide and the carbon film because of the low heat treatment temperature, and there was no SiC peak in the XRD chart. In Test No. 2, which is also Inventive Example, SiC was formed but it was a little amount with a low crystallinity, and the SiC peak with the half-value width of 2° or larger appeared in the XRD chart. Therefore, the first discharge capacity was 1796 mAh/g or more, which is excellent. Further, it was confirmed that the lithium ion secondary batteries in both Test Nos. 1 and 2 have preferable cycle characteristics.

Meanwhile, in Test Nos. 3 to 6, which are Comparison Examples, formation of crystalline SiC was progressed in the vicinity of an interface between the silicon oxide and the carbon film because of the higher treatment temperature and the SiC peak with the half-value width less than 2° appeared in the XRD chart. Therefore, the first discharge capacity was inferior to Inventive Examples according to the present invention.

INDUSTRIAL APPLICABILITY

The negative electrode material powder for a lithium ion secondary batteries and the negative electrode for the lithium ion secondary battery or the negative electrode for a capacitor according to the present invention can be used to obtain a lithium ion secondary battery and a capacitor which are durable at practical level with large discharge capacity and good cycle characteristics. The lithium ion secondary battery and capacitor of the present invention are large in discharge capacity and good in cycle characteristics. Accordingly, the present invention is a useful technique in the field of secondary batteries and capacitors.

REFERENCE SIGNS LIST

1: Positive electrode
1a: Counter electrode case
1b: Counter electrode current collector
1c: Counter electrode
2: Negative electrode
2a: Working electrode case
2b: Working electrode current collector
2c: Working electrode
3: Separator
4: Gasket
5. Vacuum chamber
6: Raw material chamber
7: Precipitation chamber
8: Raw material container
9: Mixed granulated raw material
10: Heating source
11: Precipitation substrate
12: Lower silicon oxide

What is claimed is:

1. A negative electrode material powder for a lithium ion secondary battery having a conductive carbon film on the surface of a lower-silicon-oxide powder; wherein
   a specific surface area determined by the BET method ranges from more than 0.3 m$^2$/g to 40 m$^2$/g, and
   a SiC peak is immune from appearing at 2θ=35.6°±0.1° or the half-value width of the appeared peak is 2° or more, in measurement with an X-ray diffractometer using CuK$_\alpha$ rays radiation, and
   in measurement with an XRD using Cuk$_\alpha$ rays radiation, P2/P1<0.01 is satisfied, given that the highest value of halo due to SiO$_x$ that appears at 2θ=10° to 30° is P1 and a value of the strongest linear peak of Si (111) that appears at 2θ=28.4±0.3° above said halo is P2.

2. The negative electrode material powder for the lithium ion secondary battery according to claim 1, wherein the proportion occupied by the conductive carbon film is in the range of 0.2% to 2.5% by mass.

3. The negative electrode material powder for the lithium ion secondary battery according to claim 1, wherein the specific resistance is 100000 Ωcm or less.

4. A negative electrode for a lithium ion secondary battery or a negative electrode for a capacitor using the negative electrode material powder for the lithium ion secondary battery according to claim 1.

5. A lithium ion secondary battery or a capacitor using the negative electrode for the lithium ion secondary battery or the negative electrode for the capacitor according to claim 4.

6. A negative electrode for a lithium ion secondary battery or a negative electrode for a capacitor using the negative electrode material powder for the lithium ion secondary battery according to claim 2.

7. A negative electrode for a lithium ion secondary battery or a negative electrode for a capacitor using the negative electrode material powder for the lithium ion secondary battery according to claim 3.

8. A lithium ion secondary battery or a capacitor using the negative electrode for the lithium ion secondary battery or the negative electrode for the capacitor according to claim 6.

9. A lithium ion secondary battery or a capacitor using the negative electrode for the lithium ion secondary battery or the negative electrode for the capacitor according to claim 7.

10. The negative electrode material powder for the lithium ion secondary battery according to claim 2, wherein the specific resistance is 100000 Ωcm or less.

11. A negative electrode for a lithium ion secondary battery or a negative electrode for a capacitor using the negative electrode material powder for the lithium ion secondary battery according to claim 10.

12. A lithium ion secondary battery or a capacitor using the negative electrode for the lithium ion secondary battery or the negative electrode for the capacitor according to claim 11.

* * * * *